(12) United States Patent
Okamoto (10) Patent No.: US 11,354,117 B2
(45) Date of Patent: Jun. 7, 2022

(54) ADAPTABLE PATCHING MECHANISM FOR MIXED MEMORY SYSTEMS

(71) Applicant: Oracle International Corporation, Redwood Shores, CA (US)

(72) Inventor: Kari Diane Okamoto, Santa Clara, CA (US)

(73) Assignee: Oracle International Corporation, Redwood Shores, CA (US)

(*) Notice: Subject to any disclaimer, the term of this patent is extended or adjusted under 35 U.S.C. 154(b) by 771 days.

(21) Appl. No.: 15/208,914

(22) Filed: Jul. 13, 2016

(65) Prior Publication Data

US 2018/0018157 A1 Jan. 18, 2018

(51) Int. Cl.
*G06F 8/65* (2018.01)
*G06F 12/10* (2016.01)

(52) U.S. Cl.
CPC .............. *G06F 8/66* (2013.01); *G06F 12/10* (2013.01); *G06F 2212/1041* (2013.01)

(58) Field of Classification Search
None
See application file for complete search history.

(56) References Cited

U.S. PATENT DOCUMENTS

| | | | | |
|---|---|---|---|---|
| 4,831,517 A * | 5/1989 | Crouse | ...................... | G06F 8/66 714/6.13 |
| 5,802,549 A | 9/1998 | Goyal et al. | | |
| 6,351,822 B1 * | 2/2002 | Wright | ...................... | G06F 8/66 712/E9.062 |
| 7,290,081 B2 | 10/2007 | Parthasarathy et al. | | |
| 7,310,800 B2 | 12/2007 | Brouwer | | |
| 9,772,953 B2 * | 9/2017 | Chen | .................... | G06F 12/1408 |
| 2004/0015922 A1 * | 1/2004 | Kitakami | .............. | G06F 8/4432 717/154 |
| 2004/0255283 A1 * | 12/2004 | Rudelic | ..................... | G06F 8/65 717/151 |
| 2005/0030796 A1 | 2/2005 | Saado | | |

(Continued)

OTHER PUBLICATIONS

Awan. "Why is an operating system software loaded from hard disk than from a rom chip?" StackOverflow, Jan. 17, 2011, stackoverflow. com/questions/4710339/why-is-an-operating-system-software-loaded-from-hard-disk-than-from-a-rom-chip. Accessed May 19, 2018.*

(Continued)

*Primary Examiner* — Qing Chen
(74) *Attorney, Agent, or Firm* — Fish IP Law, LLP (57) ABSTRACT

A method includes storing, on immutable memory, a first separately compiled portion of an OS, the first separately compiled portion having a first OS section including a patch hook having a patch lookup table address and associated with a first index value, and a second OS section including the patch hook associated with a second index value, storing, on mutable memory, a second separately compiled portion of the operating system, the second separately compiled portion including a patch lookup table at the patch lookup table address. The first and the second separately compiled portion are linked to form the OS. A determination is made that a change is required in the first OS section of the first separately compiled portion, resulting in updating the second separately compiled portion to include a first patch for the first OS section at a first patch address, and updating the patch lookup table.

14 Claims, 5 Drawing Sheets

(56) References Cited

U.S. PATENT DOCUMENTS

| | | | |
|---|---|---|---|
| 2007/0113067 A1* | 5/2007 | Oh | G06F 8/65 |
| | | | 713/2 |
| 2007/0198787 A1* | 8/2007 | Jessani | G06F 9/328 |
| | | | 711/159 |
| 2008/0184072 A1 | 7/2008 | Odlivak et al. | |
| 2008/0263533 A1 | 10/2008 | Huque et al. | |
| 2009/0013124 A1* | 1/2009 | Itkin | G06F 9/32 |
| | | | 711/103 |
| 2009/0013166 A1* | 1/2009 | Crowder, Jr. | G06F 21/31 |
| | | | 713/2 |
| 2010/0106953 A1* | 4/2010 | Morad | G06F 8/66 |
| | | | 713/2 |
| 2010/0107149 A1* | 4/2010 | Hsu | G06F 9/328 |
| | | | 717/168 |
| 2010/0250908 A1* | 9/2010 | Amann | G06F 8/656 |
| | | | 713/1 |
| 2011/0143661 A1 | 6/2011 | Hartwig et al. | |
| 2013/0013849 A1 | 1/2013 | Varma et al. | |
| 2014/0237464 A1* | 8/2014 | Waterman | G06F 8/65 |
| | | | 717/172 |
| 2014/0244991 A1 | 8/2014 | Akdemir et al. | |
| 2015/0242626 A1* | 8/2015 | Wang | G06F 21/577 |
| | | | 726/23 |
| 2015/0347162 A1* | 12/2015 | Ahmad | G06F 9/44521 |
| | | | 717/162 |
| 2016/0019036 A1* | 1/2016 | Bar-Or | G06F 8/66 |
| | | | 717/159 |
| 2016/0019054 A1* | 1/2016 | Bar-Or | G06F 8/658 |
| | | | 717/168 |
| 2017/0039056 A1* | 2/2017 | Ninos | G06F 3/0653 |
| 2017/0090909 A1* | 3/2017 | Guo | G06F 21/57 |

OTHER PUBLICATIONS

Data, Anshul, "Patching Mechanism and Enhancements in SCOSTA Smart Card Operating System", Indian Institute of Technology Kanpur, Jul. 2009. (64 pages).

Sherwood, Timothy, et al., "Patchable Instruction ROM Architecture", University of California, San Diego, 2001. (10 pages).

Barr, Michael, "How to Design App-Ready Embedded Systems", Sep. 1999, retrieved from http://www.barrgroup.com/Embedded-Systems/How-To/Add-On-Firmware-Upgrades on Jul. 13, 2016. (10 pages).

Tran, Khai, Patching Java Executables—The Easy Way, NetSPI Blog, May 16, 2013, 5 pages.

* cited by examiner

ADAPTABLE PATCHING MECHANISM FOR MIXED MEMORY SYSTEMS

BACKGROUND

Immutable memory, such as read-only memory (ROM), is often low cost and reliable when compared with other memory types. However, such memory must generally be written to before a product that includes the immutable memory is sent to customers and is generally wasteful, time-consuming, and/or expensive to update, especially in large quantities. Such a problem may be avoided by instead using mutable memory (i.e., memory that may be written and re-written, such as flash memory), which may be written to and thus updated. However, mutable memory is generally more expensive and less durable than immutable memory.

SUMMARY

In general, in one or more embodiments, the disclosure is directed toward a method comprising storing, on immutable memory, a first separately compiled portion of an operating system, the first separately compiled portion comprising a first operating system section comprising a patch hook comprising a patch lookup table address and associated with a first index value, and a second operating system section comprising the patch hook associated with a second index value, storing, on mutable memory, a second separately compiled portion of the operating system, the second separately compiled portion comprising a patch lookup table at the patch lookup table address, wherein the first separately compiled portion and the second separately compiled portion are linked to form the operating system, making a determination that a change is required in the first operating system section of the first separately compiled portion, updating, based on the determination, the second separately compiled portion to include a first patch for the first operating system section at a first patch address, updating the patch lookup table to include the first patch address at an index location corresponding to the first index value, executing, before executing the first operating system section, the patch hook associated with the first index to determine that the first patch is at the first patch address, and executing the first patch instead of the first operating system section.

In general, in one or more embodiments, the disclosure is directed toward a system, comprising an immutable memory operatively connected to a processor and comprising a first separately compiled portion of an operating system, the first separately compiled portion comprising, a first operating system section comprising a patch hook comprising a patch lookup table address and associated with a first index value, and a second operating system section comprising the patch hook and associated with a second index value, a mutable memory operatively connected to the processor and comprising a second separately compiled portion of the operating system, the second separately compiled portion comprising, a patch lookup table at the patch lookup table address, the patch lookup table comprising a first patch address at an index location corresponding to the first index value, and a first patch at the first patch address, wherein the first separately compiled portion and the second separately compiled portion are linked to form the operating system, and the processor, configured to execute, before executing the first operating system section, the patch hook associated with the first index value to determine that the first patch is at the first patch address, and execute the first patch instead of the first operating system section.

In general, in one or more embodiments, the disclosure is directed toward a non-transitory computer readable medium comprising instructions that, when executed by a processor, perform a method comprising storing, on immutable memory, a first separately compiled portion of an operating system, the first separately compiled portion comprising, a first operating system section comprising a patch hook comprising a patch lookup table address and associated with a first index value, and a second operating system section comprising the patch hook associated with a second index value, storing, on mutable memory, a second separately compiled portion of the operating system, the second separately compiled portion comprising a patch lookup table at the patch lookup table address, wherein the first separately compiled portion and the second separately compiled portion are linked to form the operating system, making a determination that a change is required in the first operating system section of the first separately compiled portion, updating, based on the determination, the second separately compiled portion to include a first patch for the first operating system section at a first patch address, updating the patch lookup table to include the first patch address at an index location corresponding to the first index value, executing, before executing the first operating system section, the patch hook associated with the first index to determine that the first patch is at the first patch address, and executing the first patch instead of the first operating system section.

Other aspects disclosed herein will be apparent from the following description and the appended claims.

BRIEF DESCRIPTION OF DRAWINGS

FIGS. 3.1 and 3.2 show examples in accordance with one or more embodiments disclosed herein.

FIG. 4.1 and FIG. 4.2 show computing systems in accordance with one or more embodiments disclosed herein.

DETAILED DESCRIPTION

Specific embodiments disclosed herein will now be described in detail with reference to the accompanying figures. Like elements in the various figures may be denoted by like names and/or like reference numerals for consistency.

In the following detailed description of various embodiments, numerous specific details are set forth in order to provide a more thorough understanding of the embodiments. However, it will be apparent to one of ordinary skill in the art that the various embodiments may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments disclosed herein relate to a method, system, and non-transitory computer readable medium for adaptable patching in mixed memory systems. Specifically, in one or more embodiments disclosed herein, an operating system for a mixed memory device is deployed partially on immutable memory (e.g., read-only memory) of a device and partially on mutable memory of the mixed memory device (e.g., flash memory). More specifically, the mutable memory portion of the operating system may include a patch lookup table as well as space for patches. In one or more embodiments disclosed herein, when the operating system requires an update, one or more patches are stored in the mutable memory, and the address at which the patch is stored is added to a location in the patch lookup table that corresponds to an index value associated with the section of the operating system to be patched.

In one or more embodiments disclosed herein, when the operating system executes, before execution of a given operating system section, a patch hook is executed. The patch hook may include functionality to use the index value associated with the operating system section and the address of the patch lookup table to determine if there is a patch for the operating system section. In one or more embodiments disclosed herein, if there is no entry (e.g., a "0") at the index location in the patch lookup table, then there is no patch, while an address in the index location indicates both that there is a patch, and the address at which the patch may be found. If a patch is found to be present, the patch may be executed instead of the operating system section.

Figure 1:
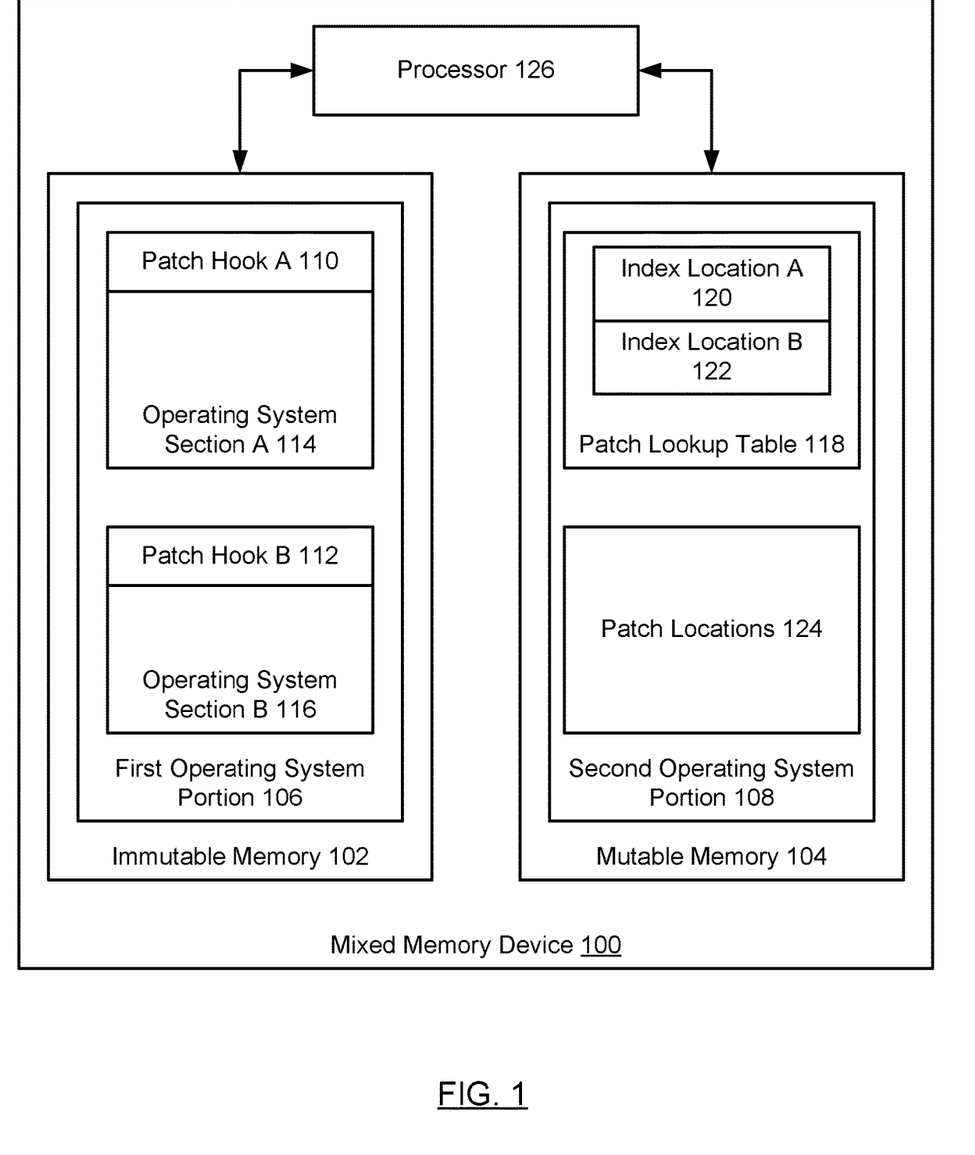
FIG. 1 shows a system in accordance with one or more embodiments disclosed herein.

FIG. 1 shows a system in accordance with one or more embodiments disclosed herein. As shown in FIG. 1, the system includes a mixed memory device (100). In one or more embodiments disclosed herein, the mixed memory device (100) includes a processor (126), immutable memory (102), and mutable memory (104). The immutable memory (102) may include a first operating system portion (106). The first operating system portion (106) may include any number of operating system sections (e.g., 114, 116), each of which may include a patch hook (e.g., 110, 112). The mutable memory (104) may include a second operating system portion (108). The second operating system portion (108) may include any number of patch locations (124) and a patch lookup table (118). The patch lookup table (118) may include any number of index locations (e.g., 120, 122). Each of these components is described below.

In one or more embodiments disclosed herein, a mixed memory device (100) is any computing device, or any portion thereof that includes mixed memory. As used herein, the term mixed memory refers to the presence of both immutable memory (102) and mutable memory (104), which are described below, and which may or may not be physically co-located. In one or more embodiments disclosed herein, a computing device includes hardware, software, firmware, circuitry, and/or any combination thereof. In one or more embodiments disclosed herein, a computing device is any device, or any set of devices, capable of electronically processing instructions and that includes at least the minimum processing power, memory (i.e., immutable and mutable memory), input and output device(s), and/or network connectivity in order to contribute to the performance of at least some portion of the functions described in accordance with one or more embodiments disclosed herein.

A computing device may be powered, such as via a battery or a power supply connected to an electrical outlet. Examples of powered computing devices include, but are not limited to, a server (e.g., a blade-server in a blade-server chassis), a virtual machine (VM), a desktop computer, a mobile device (e.g., laptop computer, smart phone, personal digital assistant, tablet computer, and/or any other mobile computing device), and/or any other type of computing device with the aforementioned minimum requirements.

Additionally or alternatively, a computing device may be non-powered, and, as such, require the receipt of power via signals from other devices when in contact with or proximity to the other device. Examples of non-powered computing devices include, but are not limited to, smart cards, proximity cards, radio frequency identification (RFID) tags, input/output devices, detachable storage devices, etc.

Additional examples of computing devices include, but are not limited to, computing devices embedded in other products, such as thermostats, vehicles, buildings, meters, medical devices, appliances, light sources, vending machines, security devices, cameras, etc. Such devices may be powered or non-powered.

In one or more embodiments disclosed herein, the mixed memory device (100) includes immutable memory (102) (i.e., 'read-only' memory). In one or more embodiments disclosed herein, immutable memory (102) is any computer memory that, once written to, may either not be rewritten to (e.g., hardwired circuitry, mask read-only memory (ROM) etc.), or may not be rewritten to easily (e.g., programmable ROM (PROM), erasable PROM (EPROM) etc.). In one or more embodiments disclosed herein, immutable memory (102) may include functionality to store instructions, programs, operating systems (or portions thereof), or any other form of computer readable code (e.g., software or firmware) in any programming language. In one or more embodiments disclosed herein, immutable memory (102) may have any number of addresses at which data of any type may be stored.

In one or more embodiments disclosed herein, the immutable memory (102) may execute at higher speeds and/or may be more reliable than mutable memory (104). In one or more embodiments disclosed herein, immutable memory (102) may be lower cost than mutable memory (104). In one or more embodiments disclosed herein, the immutable memory (102) is non-volatile memory. Non-volatile memory may be memory that is persistent storage, which maintains stored data even when not supplied with power. In one or more embodiments, the immutable memory (102) is either electrically or mechanically addressed. In one or more embodiments disclosed herein, data may be stored on immutable memory (102) of the mixed memory device (100) by the mixed memory device manufacturer before the mixed memory device is provided to users. Alternatively, data (e.g., an operating system portion) may be stored by any other entity, included the user.

In one or more embodiments disclosed herein, the immutable memory (102) includes functionality to store a first operating system portion (106). In one or more embodiments disclosed herein, the first operating system portion (106) is a portion of an operating system. In one or more embodiments disclosed herein, an operating system (OS) includes any software and/or firmware for managing the resources (e.g., hardware, other software, etc.) of one or more computing devices. More specifically, the OS may be a program or set of programs that manages all of the other software (e.g., applications) in a computing device. Management by an OS may include scheduling, hardware allocation, application execution, network access, management of access to stored files that are selectively made available to applications running on the OS, etc. An OS may also manage and enforce settings and permissions customized for specific applications running on the OS.

In one or more embodiments disclosed herein, the first operating system portion (106) is separately compiled and stored on the immutable memory (102). In one or more embodiments disclosed herein, the phrase 'storing on [a type of] memory' refers to any action (e.g., 'loading', 'installing', 'programming', 'maintaining', 'initializing', etc.) whose result is to deploy an operating system portion (e.g., first operating system portion (106), second operating system portion (108)) on memory (e.g., immutable memory (102), mutable memory (104)).

In one or more embodiments disclosed herein, the first operating system portion (106) is referred to as separately compiled to indicate that the first operating system portion is compiled separately from other operating system portions, which may be stored elsewhere (e.g., on mutable memory (104)). For example, the first operating system portion may be compiled and deployed on immutable memory (102), while the second operating system portion (108) is compiled in a separate instance of compilation using the same or a different compiler at the same or different times, after which the second operating system portion is deployed on the mutable memory. In one or more embodiments, each portion of the OS is both compiled and linked independently to ensure that there are no dependencies between them.

In one or more embodiments disclosed herein, the separate compilation of operating system portions is performed by one or more compilers (not shown). In one or more embodiments disclosed herein, a compiler is a computer program or set of programs designed to transform source code written in one or more programming languages, or intermediate representations (IRs) of a program, into machine code that is capable of being executed (e.g., via a processor). For example, a compiler may include functionality to create machine code that improves the execution speed, reduces memory footprint, optimizes loop execution, optimizes object handling, etc. of the program via any type of compiler optimization. In one or more embodiments disclosed herein, the compiler includes functionality to perform compilation of operations or functions as the program is executing (e.g., just-in-time (JIT) compilation).

In one or more embodiments, the output of a compiler is machine code. In one or more embodiments, machine code is a set of instructions that may be executed by one or more processors of a computing device (e.g., mixed memory device (100)). Machine code may be specific to physical and/or virtual hardware of the execution environment for which the machine code was generated. Machine code may be executed after it is generated by a compiler. Additionally or alternatively, machine code may be stored in memory (not shown) and/or a storage device (not shown) for future execution.

In one or more embodiments disclosed herein, separate compilation of operating system portions allows for recompilation and/or updating of some operating system portions without the need for recompiling and/or updating other portions. Such separate compilation may, for example, allow for the operating system on the immutable memory (102) not to require updating, which may be difficult to achieve due to the limitations of the immutable memory, when other operating system portions are updated or recompiled. In one or more embodiments disclosed herein, the first operating system portion (106) includes any number of operating system sections (e.g., operating system section A (114), operating system section B (116)). In one or more embodiments disclosed herein, an operating system section is any portion, or all, of the first operating system portion (106) stored on the immutable memory (102). For example, an operating system section may be, but is not limited to, a single line of the operating system code, a single function within the operating system, a set of functions of the operating system, the entire operating system, or any combination thereof. In one or more embodiments disclosed herein, an operating system section is partitioned as such to allow for patching of the operating system section. In one or more embodiments disclosed herein, an operating system section may be selected to be patchable based on its call tree and other attributes.

In one or more embodiments disclosed herein, each operating system section (e.g., operating system section A (114), operating system section B (116)) that may require patches from time to time includes a patch hook (e.g., patch hook A (110), patch hook B (112)). In one or more embodiments disclosed herein, a patch hook is a macro call with a unique numbered value. In one or more embodiments disclosed herein, each operating system section to be patched includes the same patch hook macro, differing only by the unique numbered value. The unique numbered value may be referred to as an index value. In one or more embodiments disclosed herein, the index value is associated with the operating system section in which a given instance of the patch hook is located, and corresponds to an index location (e.g., index location A (120), index location B (122)) in the patch lookup table (118) (discussed below) of the second operating system portion (108) stored on the mutable memory (104). For example, patch hook A (110) may include an index value of 27, which is consistently associated with operating system section A (114) and corresponds to index location 27 (i.e., index location A (120)) in the patch lookup table (118).

In one or more embodiments disclosed herein, a patch hook (e.g., patch hook A (110), patch hook B (112)) for an operating system section allows for patching the operating system section, and executes before the operating system section executes. In one or more embodiments disclosed herein, the patch hook (e.g., patch hook A (110), patch hook B (112)) includes functionality to check the index location in the patch lookup table (118) identified by the index value. If there is no entry in the index location indicating that a patch exists (e.g., the index location is populated with a 0), the patch hook may return and execution of the operating system section may continue. However, in one or more embodiments disclosed herein, if the patch hook (e.g., patch hook A (110), patch hook B (112)) finds an address in the index location, then a patch exists at the address and is executed in lieu of the operating system section. In one or more embodiments disclosed herein, a patch hook (e.g., patch hook A (110), patch hook B (112)) is responsible for accessing any required parameters from the stack or registers of the mixed memory device (100), setting any necessary return values correctly, and returning execution to the proper place in the first operating system portion upon exit.

A non-limiting example of a patch hook macro is as follows:
define PATCH(x) if(PATCHES_P[x] !=0) {((void(code*) (void))(PATCHES_P[x]))( );}

In the above example patch hook macro, 'Patches_P' is a pointer to the address in the mutable memory (104) where the patch lookup table (118) begins, and [x] is the index value identifying a location within the patch lookup table (118). In one or more embodiments disclosed herein, the address of the patch lookup table (118) in the mutable memory (104) remains fixed, and the index value associated with an operating system section remains constant so that the patch hook (e.g., patch hook A (110), patch hook B (112)) always checks for patches at the correct index location (e.g., index location A (120), index location B (122)) in the patch lookup table (118). In one or more embodiments disclosed herein, the use of a constant address for the patch lookup table (118) and consistent index values for the operating system sections creates a link between the separately compiled first operating system portion (106) and the second operating system portion (108) to form the operating system.

In one or more embodiments disclosed herein, all patches (described below) are in the form of one or more functions with no input parameters and a void return type, which may allow for the use of a single patch hook macro (e.g., the above example patch hook macro) throughout the entire first operating system portion (106). The use of a single patch hook macro may decrease support code requirements, and may provide the opportunity for compiler optimizations to reduce the total size of the first operating system portion (106).

In one or more embodiments disclosed herein, the number of operating system sections (e.g., operating system section A (114), operating system section B (116)) for which patching is implemented using a patch hook (e.g., patch hook A (110), patch hook B (112)) may impact the speed of execution of the operating system. For example, a more granular level of patching (e.g., where every line code is an operating system section) may decrease execution speed of the operating system more than a more coarse level of patching (e.g., where there are two operating system sections). The speed decrease may be due to the increase in the number of times the patch hook macro is executed during execution of the first operating system portion, which increases with the number of operating system portions.

In one or more embodiments disclosed herein, the mixed memory device (100) includes mutable memory (104). In one or more embodiments disclosed herein, mutable memory (104) is any memory on which data may be written and rewritten. Examples of mutable memory (104) may include, but are not limited to, flash memory, electronically erasable PROMs, hard disks, etc. In one or more embodiments disclosed herein, the mutable memory (104) includes memory space for storing a second operating system portion (described below), and may also include memory space for storing additional information of any type (e.g., mixed memory device user information).

In one or more embodiments disclosed herein, the mutable memory (104) includes functionality to store a second operating system portion (108). In one or more embodiments disclosed herein, the second operating system portion (108) is a portion of an operating system for managing a mixed memory device (100). Specifically, in one or more embodiments disclosed herein, the second operating system portion (108) is a separately compiled operating system portion that includes functionality to provide patching of the first operating system portion (106) stored on the immutable memory (102). In one or more embodiments disclosed herein, the second operating system portion (108) may be recompiled and/or updated by writing to the mutable memory (104).

In one or more embodiments disclosed herein, the second operating system portion (108) includes a patch lookup table (118), and storage for patches (i.e., patch locations (124)). In one or more embodiments disclosed herein, the patch lookup table (118) is any data structure (e.g., an array) that begins at a constant mutable memory address, and includes any number of index locations (e.g., index location A (120), index location B (122)). As described above, each index location (e.g., index location A (120), index location B (122)) may correspond to an index value associated with an operating system section of the first operating system portion (106). In one or more embodiments disclosed herein, the number of index locations (e.g., index location A (120), index location B (122)) in the patch lookup table is equivalent to the number of operating system sections (e.g., operating system section A (114), operating system section B (116)) of the first operating system portion (106) selected to have patch capability. In such embodiments, the relationship between the operating system sections and the index locations remains constant. In one or more embodiments disclosed herein, greater Hamming distances (e.g., in the mutable memory (104)) between index locations (e.g., index location A (120), index location B (122)) may be used to protect against perturbation and fault injection attacks. Additional security measures that may be used to secure the mixed memory device (100) include checksums on various parts of code, error detection functionality, and/or encryption of the immutable memory (102) and/or mutable memory (104).

In one or more embodiments disclosed herein, the patching described herein is scalable and adaptable to specific system requirements, including size of each memory, available space for patches, size of patches required, ease of patch creation, and performance overhead. Any number of patches may be included, and patches can be further updated and/or replaced as needed. In one or more embodiments disclosed herein, the patch lookup table size may be modified in order to provide a more optimal balance for the system based on the amount of mutable memory available to maintain patch support and the maximum preferred patch size and complexity.

In one or more embodiments disclosed herein, the patch locations (124) are addresses of the mutable memory (104) at which patches (not shown) are stored. In one or more embodiments disclosed herein, patches may be added as needed to the second operating system portion (108), which is recompiled and stored on the mutable memory (104). Additionally or alternatively, patches may be added individually to the already deployed second operating system portion (108) when a patch is needed for an operating system section (e.g., operating system section A (114), operating system section B (116)) of the first operating system portion (106).

In either case, in one or more embodiments disclosed herein, when an operating system section (e.g., operating system section A (114), operating system section B (116)) requires patching, the patch is added, and the patch lookup table (118) is updated at the index location corresponding to the operating system section to include the address at which the patch is stored. This may allow the patch hook (e.g., patch hook A (110), patch hook B (112)) of the operating system section (e.g., operating system section A (114), operating system section B (116)) to determine that a patch exists for the operating system section, and thus execute the patch instead of the operating system section.

In one or more embodiments disclosed herein, a patch is any data (e.g., substitute operating system code) that may be executed to perform any functionality related to the operating system of the mixed memory device (100). In one or more embodiments disclosed herein, a patch may include functionality to perform a callback. A callback may be a call back to the first operating system portion (106) to perform any number of operations, instructions, functions, etc. A callback may be performed by using the fixed address in immutable memory (102) in the relevant part of the first operating system portion (106).

A non-limiting example of a callback function is as follows:

define CALLBACK1 ((unsigned short (code*)(unsigned long* in))0x1234)

In one or more embodiments disclosed herein, the immutable memory (102) and the mutable memory (104) are each operatively connected to a processor (126). In one or more embodiments disclosed herein, a processor (126) may be any one or more integrated circuits for processing instructions (e.g., the operating system of the mixed memory device). A processor (126) may include any number of cores in a single unit, and may include any number of such units. In one or more embodiments disclosed herein, the processor (126) executes the operating system of the mixed memory device, and also includes functionality to execute any other software or firmware of the mixed memory device (100).

In one or more embodiments disclosed herein, although not shown in FIG. 1, the immutable memory, mutable memory, or any other appropriate portion of the mixed memory device may include functionality to execute an interpreter. An interpreter may be a computer program that includes functionality to first translate the source code of a program (e.g., first operating system portion (106)) into an IR, and then to execute the IR via interpretation. In one or more embodiments, an IR, once translated, may be include the functionality of an interpreter and, as such, may include functionality to execute itself. In one or more embodiments, each element of an IR (e.g., each AST node) has an interpreter unit directly embedded, which provides the IR functionality to execute itself after translation occurs. For example, if the IR is an AST, an add node of the AST may include functionality to compute the sum.

The IR of the program (e.g., first operating system portion (106), second operating system portion (108)) generated by an interpreter may take any IR form including, but not limited to: ASTs, bytecodes, graphs, flows, and/or any other suitable IR forms. In one or more embodiments disclosed herein, the interpreter may include functionality to function in conjunction with and/or in lieu of a compiler. For example, an IR may be executed mostly by an interpreter, while having some portions compiled for faster execution.

In one or more embodiments disclosed herein, although not shown in FIG. 1, the immutable memory and/or the mutable memory may execute a virtual machine (VM) in which an operating system portion executes. In one or more embodiments disclosed herein, a VM (i.e., a logical domain) is a software emulation of a hardware execution environment. For example, a virtual machine may include a virtual emulation of processors, memory, I/O devices, etc. Said another way, in one or more embodiments disclosed herein, a VM is a software implementation of a computing device executing on an underlying computing device. A VM may abstract the operating system and hardware of the underlying computing device from instructions that are executed in the VM. In one or more embodiments disclosed herein, a virtual machine is an isolated execution environment in which software (e.g., an operating system portion) may execute.

In one or more embodiments disclosed herein, a virtual machine requires a virtual machine manager (e.g., a hypervisor, another operating system, etc.) that manages virtual machines by partitioning and providing to one or more virtual machines the underlying physical hardware of a computing device (e.g., processors, memory, network devices, etc.). In one or more embodiments disclosed herein, a virtual machine may include functionality to be deployed on a wide variety of hardware types, and thus allow for execution of program. In one or more embodiments disclosed herein, one or both of the first operating system portion (106) and the second operating system portion (108) may execute in a virtual machine. Execution of the first operating system portion (106) and the second operating system portion (108) in a VM may include interpretation and/or compilation.

While FIG. 1 shows a configuration of components, other configurations may be used without departing from the scope disclosed herein. For example, various components may be combined to create a single component. As another example, the functionality performed by a single component may be performed by two or more components. In one or more embodiments, one or more of the modules and elements shown in FIG. 1 may be omitted, repeated, and/or substituted. Accordingly, embodiments should not be considered limited to the specific arrangements of modules and elements shown in FIG. 1.

Figure 2:
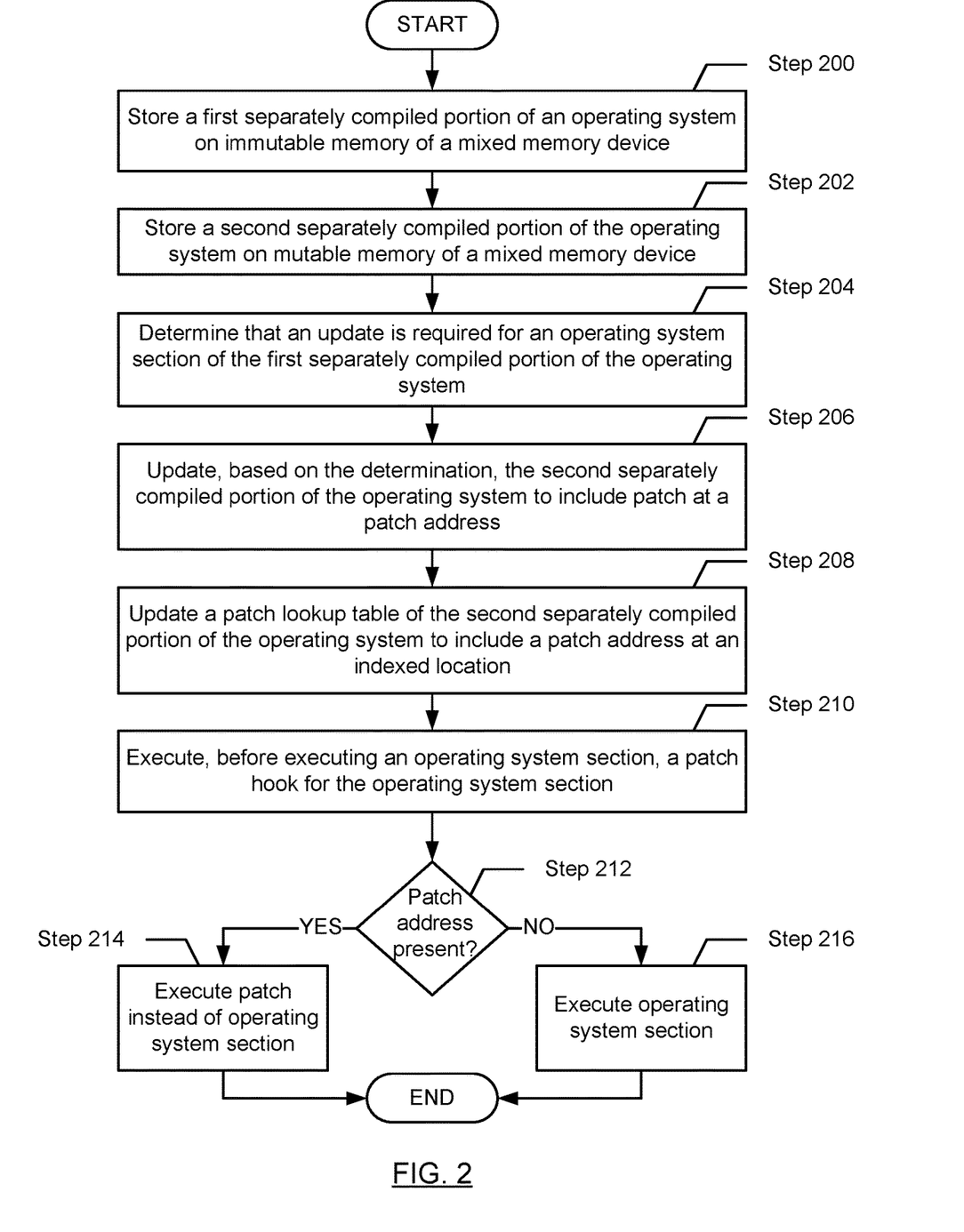
FIG. 2 shows a flowchart in accordance with one or more embodiments disclosed herein.

FIG. 2 shows a flowchart in accordance with one or more embodiments disclosed herein. While the various steps in these flowcharts are presented and described sequentially, one of ordinary skill in the art will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments disclosed herein.

FIG. 2 shows a flowchart describing a method for adaptable patching of a mixed memory device operating system in accordance with one or more embodiments disclosed herein. In Step 200, a first separately compiled portion of an operating system is stored on immutable memory of a mixed memory device. In one or more embodiments disclosed herein, the first operating system portion includes one or more operating system sections, each including a patch hook with an index value associated with the operating system section. In one or more embodiments disclosed herein, the first operating system portion may be stored on the immutable memory before a mixed memory device is provided to a user of the device. For example, the first operating system portion may be stored on the immutable memory, such as a mask ROM, using a fabrication technique that involves various steps, including a photolithography step for which a 'mask' is used to pattern the material of the immutable memory (e.g., silicon).

In Step 202, a second separately compiled portion of an operating system is stored on mutable memory of a mixed memory device. In one or more embodiments disclosed herein, the second operating system portion is separately compiled into a binary which is then written to the mutable memory (e.g., flash memory). The second operating system portion may be stored on the mutable memory at the same time or a different time than the first operating system portion is stored on the mutable memory. Such time may be before or after a mixed memory device is provided to a user. In one or more embodiments disclosed herein, when there are no patches required initially for the first operating system portion, the second operating system portion may include only a patch lookup table data structure with no addresses at index locations, and storage space reserved for patches. Alternatively, if the first operating system requires one or more patches initially, such patches may be included in the second operating system portion along with addresses of the patches in the patch lookup table at appropriate index locations. Those skilled in the art will appreciate that storage space for patches may not actually be "reserved" space for the patches. That is, while there may be space available for use by patches, this space may also be used for other purposes, such as for storing user data.

In Step 204, a determination is made that an update is required for an operating system section of the first operating system portion. Such a determination may be made for any reason that requires an operating system update. For example, a security flaw may have been discovered in the operating system, an improvement to the operating system is desired, a bug in the operating system software has been fixed, etc.

In Step 206, based on the determination of Step 204, the second operating system portion of the mutable memory is updated to include a patch for the operating system section to be patched. Such an update may include recompiling the second operating system portion as a new binary and storing the new binary on the mutable memory. Alternatively, the second operating system portion may be updated, without recompilation of the entire second operating system portion. The new (or updated) binary may include a patch, which is stored at an address in the patch location area of the mutable memory.

In Step 208, the second operating system portion is further updated to include the address at which the patch is stored in the patch lookup table at the index location corresponding to the operating system section to be patched. Writing the patch address to the appropriate index location may allow a patch hook for the patched operating system section to discover and execute the patch.

In Step 210, after the second operating system section has been updated as in Step 206 and Step 208 and during execution of the operating system, execution of the operating system section to be patched begins with the execution of that section's patch hook. As described above, the patch hook includes an index value of the operating system section corresponding to an index location in the patch lookup table.

In Step 212, the patch hook determines whether a patch is present for the operating system section. If the index location does not indicate that a patch is present for the operating system of the patch hook the process proceeds to Step 216. In Step 216, execution returns to the first operating system portion, and execution of the operating system continues with no patch. If an address is present in the index location identified by the index value associated with the operating system section, then the process proceeds to Step 214. In Step 214, the patch hook causes the patch to execute instead of the operating system section, after which execution returns to the first operating system portion.

Figure 31:
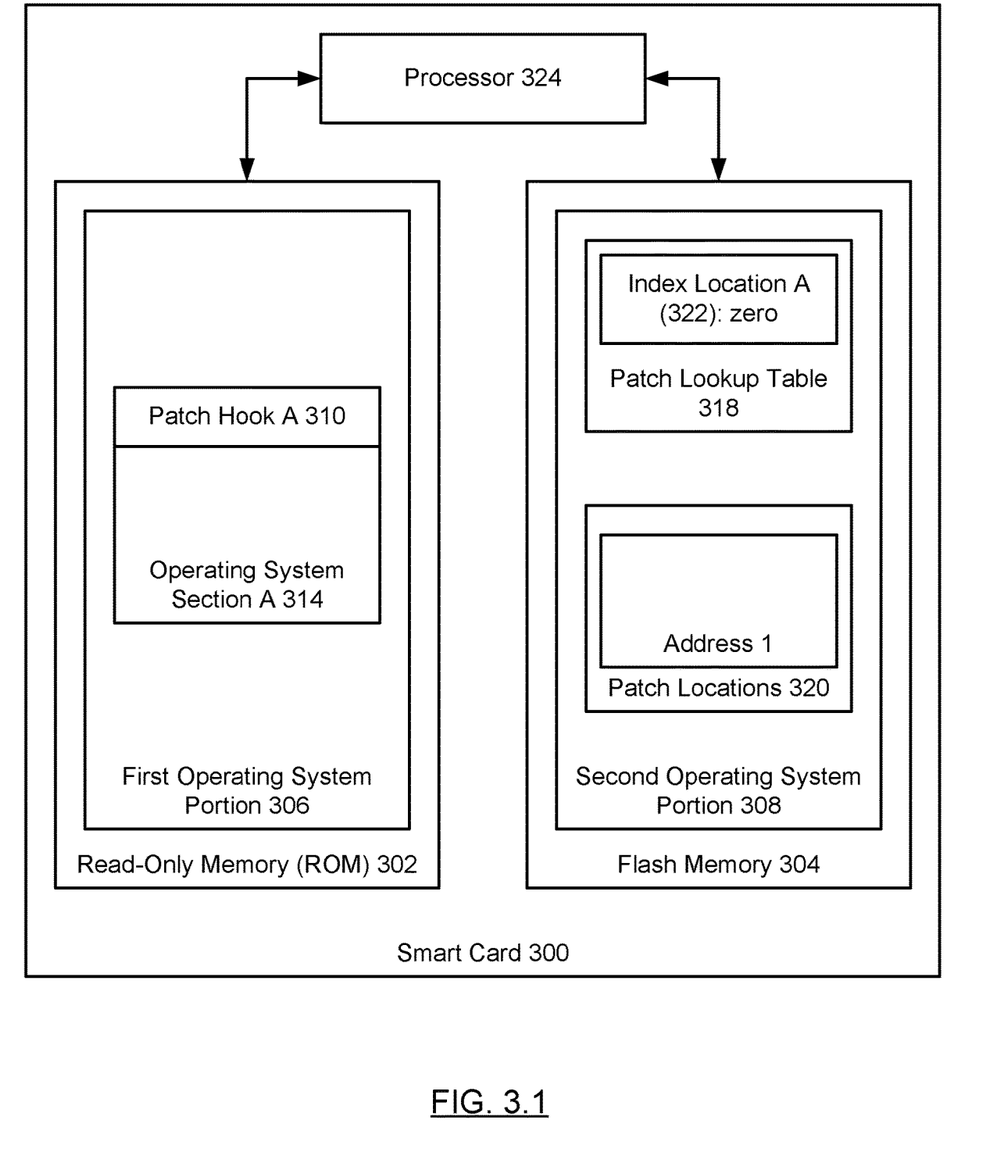
Figure 32:
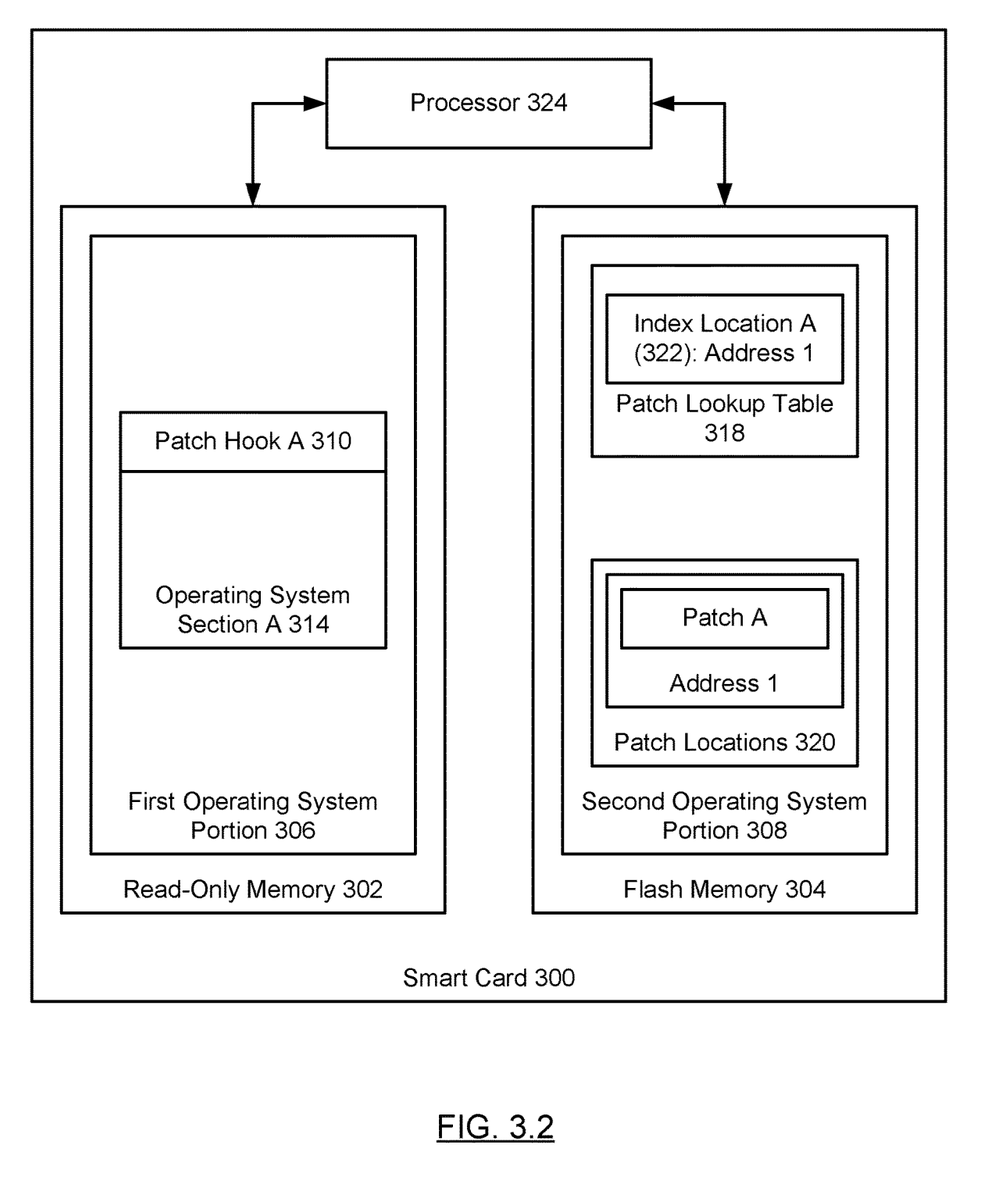

FIG. 3.1 and FIG. 3.2 show an example in accordance with one or more embodiments. The following example is for explanatory purposes only and not intended to limit the scope disclosed herein.

Referring to FIG. 3.1, consider a scenario in which smart card (300) (i.e., a mixed memory device) has previously had an operating system deployed. At the time of deployment, the operating system includes a portion (i.e., first operating system portion (306)) stored in read-only memory (ROM) (302). The smart card (300) also has a second operating system portion (308), including a patch lookup table (318) and patch locations (320) stored on flash memory (304). FIG. 3.1 shows an exemplary smart card as initially shipped to customers. The first operating system portion (306) includes operating system section A (314), which includes patch hook A (310). Patch hook A (310) includes an index value A associated with operating system section A (314) and corresponding to index location A (322) in the patch lookup table (318). Index location A includes a zero initially, indicating that no patch exists for operating system section A (314). Additionally, address 1 in the patch locations (320) is empty, as there is not yet a patch for operating system section A (314).

After shipping the smart cards to customers, it is determined that operating system section A (314) includes a security flaw. Therefore, the smart card provider updates and re-compiles the second portion of the operating system (308) to include patch A at patch address 1 and then places patch address 1 at the index location A in the patch lookup table (318) corresponding to the operating system section to be patched. The updated binary is then stored on one or more servers of the smart card provider and delivered to the smart card customers over a network. The customers then use a flash loader (not shown) to update the second operating system portion (308) of the flash memory (304).

When operating system section A (314) executes using the processor (324), patch hook A (310) will now find address 1 rather than a zero at index location A (322), and therefore executes patch A at address 1 instead of executing operating system section A (314).

Figure 41:
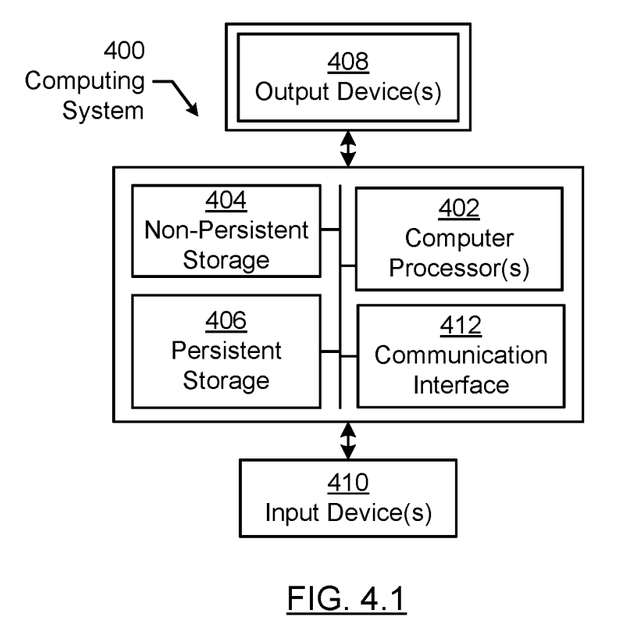

Embodiments of the disclosure may be implemented on a computing system. Any combination of mobile, desktop, server, router, switch, embedded device, or other types of hardware may be used. For example, as shown in FIG. 4.1, the computing system (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), and numerous other elements and functionalities.

The computer processor(s) (402) may be an integrated circuit for processing instructions. For example, the computer processor(s) may be one or more cores or micro-cores of a processor. The computing system (400) may also include one or more input devices (410), such as a touchscreen, keyboard, mouse, microphone, touchpad, electronic pen, or any other type of input device.

The communication interface (412) may include an integrated circuit for connecting the computing system (400) to a network (not shown) (e.g., a local area network (LAN), a wide area network (WAN) such as the Internet, mobile network, or any other type of network) and/or to another device, such as another computing device.

Further, the computing system (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 42:
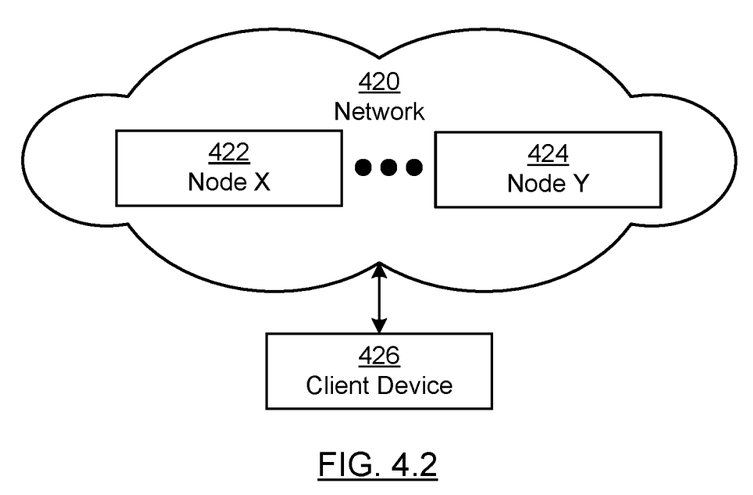

The computing system (400) in FIG. 4.1 may be connected to or be a part of a network. For example, as shown in FIG. 4.2, the network (420) may include multiple nodes (e.g., node X (422), node Y (424)). Each node may correspond to a computing system, such as the computing system shown in FIG. 4.1, or a group of nodes combined may correspond to the computing system shown in FIG. 4.1. By way of an example, embodiments of the disclosure may be implemented on a node of a distributed system that is connected to other nodes. By way of another example, one or more embodiments may be implemented on a distributed computing system having multiple nodes, where each portion of the disclosure may be located on a different node within the distributed computing system. Further, one or more elements of the aforementioned computing system (400) may be located at a remote location and connected to the other elements over a network.

Although not shown in FIG. 4.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (422), node Y (424)) in the network (420) may be configured to provide services for a client device (426). For example, the nodes may be part of a cloud computing system. The nodes may include functionality to receive requests from the client device (426) and transmit responses to the client device (426). The client device (426) may be a computing system, such as the computing system shown in FIG. 4.1. Further, the client device (426) may include and/or perform all or a portion of one or more embodiments disclosed herein.

The computing system or group of computing systems described in FIGS. 4.1 and 4.2 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

The computing system in FIG. 4.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, data container (database, table, record, column, view, etc.), identifier(s), conditions (comparison operators), functions (e.g., join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 4.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 4.1 and the nodes and/or client device in FIG. 4.2. Other functions may be performed using one or more embodiments disclosed herein.

While the disclosure has been described with respect to a limited number of embodiments, those skilled in the art, having benefit of this disclosure, will appreciate that other embodiments can be devised which do not depart from the scope of the disclosure as discussed herein. Accordingly, the scope of the disclosure should be limited only by the attached claims.

What is claimed is:

1. A method, comprising:
    storing, on an immutable memory, a first separately compiled portion of an operating system, wherein the first separately compiled portion of the operating system comprises:
        a first operating system section comprising a patch hook comprising a patch lookup table address and associated with a first index value; and
        a second operating system section comprising the patch hook and associated with a second index value;
    storing, on the mutable memory, a second separately compiled portion of the operating system, wherein the second separately compiled portion of the operating system comprises a patch lookup table at the patch lookup table address, wherein the first separately compiled portion of the operating system and the second separately compiled portion of the operating system are linked to form the operating system, wherein the patch lookup table comprises a plurality of index locations for storing a plurality of patch addresses, and wherein the plurality of index locations of the patch lookup table are separated to increase a Hamming distance between a first index location and a second index location of the plurality of index locations of the patch lookup table to at least two;
    making a determination that a change is required in the first operating system section of the first separately compiled portion of the operating system;
    updating, based on the determination, the second separately compiled portion of the operating system to include a first patch for the first operating system section of the first separately compiled portion of the operating system at a first patch address;
    updating the patch lookup table to include the first patch address at an index location corresponding to the first index value;
    executing, before executing the first operating system section of the first separately compiled portion of the operating system, the patch hook associated with the first index value to determine that the first patch is at the first patch address; and
    executing the first patch instead of the first operating system section of the first separately compiled portion of the operating system.

2. The method of claim 1, further comprising encrypting the first separately compiled portion of the operating system.

3. The method of claim 1, further comprising, before executing the first patch, validating a checksum of the patch lookup table.

4. The method of claim 1, wherein the first patch comprises a callback comprising a first pointer to a third operating system section of the first separately compiled portion of the operating system.

5. The method of claim 1, wherein the first operating system section of the first separately compiled portion of the operating system comprises a single function of a programming language.

6. A system, comprising:
    a processor;
    an immutable memory operatively connected to the processor and comprising a first separately compiled portion of an operating system, wherein the first separately compiled portion of the operating system comprises:
        a first operating system section comprising a patch hook comprising a patch lookup table address and associated with a first index value; and
        a second operating system section comprising the patch hook and associated with a second index value; and
    a mutable memory operatively connected to the processor and comprising a second separately compiled portion of the operating system, wherein the second separately compiled portion of the operating system comprises:
        a patch lookup table at the patch lookup table address, wherein the patch lookup table comprises a plurality of index locations for storing a plurality of patch addresses, and wherein the plurality of index locations of the patch lookup table are separated to increase a Hamming distance between a first index location and a second index location of the plurality of index locations of the patch lookup table to at least two; and
        a first patch at a first patch address, wherein the first separately compiled portion of the operating system and the second separately compiled portion of the operating system are linked to form the operating system; and wherein the processor is configured to:
make a determination that a change is required in the first operating system section of the first separately compiled portion of the operating system;
update, based on the determination, the second separately compiled portion of the operating system to include the first patch for the first operating system section of the first separately compiled portion of the operating system at the first patch address;
update the patch lookup table to include the first patch address at an index location corresponding to the first index value;
execute, before executing the first operating system section of the first separately compiled portion of the operating system, the patch hook associated with the first index value to determine that the first patch is at the first patch address; and
execute the first patch instead of the first operating system section of the first separately compiled portion of the operating system.

7. The system of claim 6, wherein the processor is further configured to, before executing the first patch, validate a checksum of the patch lookup table.

8. The system of claim 6, wherein the first patch comprises a callback comprising a first pointer to a third operating system section of the first separately compiled portion of the operating system.

9. The system of claim 6, wherein the first operating system section of the first separately compiled portion of the operating system comprises a single function of a programming language.

10. The system of claim 6, wherein the mutable memory comprises flash memory, and wherein the immutable memory comprises read-only memory.

11. A non-transitory computer readable medium storing instructions that, when executed by a processor, perform a method comprising:
storing, on an immutable memory, a first separately compiled portion of an operating system, wherein the first separately compiled portion of the operating system comprises:
a first operating system section comprising a patch hook comprising a patch lookup table address and associated with a first index value; and
a second operating system section comprising the patch hook and associated with a second index value;
storing, on a mutable memory, a second separately compiled portion of the operating system, wherein the second separately compiled portion of the operating system comprises a patch lookup table at the patch lookup table address, wherein the first separately compiled portion of the operating system and the second separately compiled portion of the operating system are linked to form the operating system, wherein the patch lookup table comprises a plurality of index locations for storing a plurality of patch addresses, and wherein the plurality of index locations of the patch lookup table are separated to increase a Hamming distance between a first index location and a second index location of the plurality of index locations of the patch lookup table to at least two;
making a determination that a change is required in the first operating system section of the first separately compiled portion of the operating system;
updating, based on the determination, the second separately compiled portion of the operating system to include a first patch for the first operating system section of the first separately compiled portion of the operating system at a first patch address;
updating the patch lookup table to include the first patch address at an index location corresponding to the first index value;
executing, before executing the first operating system section of the first separately compiled portion of the operating system, the patch hook associated with the first index value to determine that the first patch is at the first patch address; and
executing the first patch instead of the first operating system section of the first separately compiled portion of the operating system.

12. The non-transitory computer readable medium of claim 11, wherein the instructions of the method further comprises encrypting the first separately compiled portion of the operating system.

13. The non-transitory computer readable medium of claim 11, wherein the first patch comprises a callback comprising a first pointer to a third operating system section of the first separately compiled portion of the operating system.

14. The non-transitory computer readable medium of claim 11, wherein the first operating system section of the first separately compiled portion of the operating system comprises a single function of a programming language.

* * * * *